(12) United States Patent
Tveit (10) Patent No.: US 8,944,632 B2
(45) Date of Patent: Feb. 3, 2015

(54) LED LIGHTING SYSTEM AND METHOD FOR EXTERNAL SURFACES

(76) Inventor: Douglas Tveit, Willernie, MN (US)

(*) Notice: Subject to any disclaimer, the term of this patent is extended or adjusted under 35 U.S.C. 154(b) by 284 days.

(21) Appl. No.: 12/905,721

(22) Filed: Oct. 15, 2010

(65) Prior Publication Data

US 2012/0091919 A1 Apr. 19, 2012

(51) Int. Cl.

| | | |
|---|---|---|
| *H05B 37/02* | (2006.01) | |
| *F21V 9/00* | (2006.01) | |
| *F21S 4/00* | (2006.01) | |
| *F21S 2/00* | (2006.01) | |
| *F21V 1/22* | (2006.01) | |
| *F21V 3/04* | (2006.01) | |
| *F21V 23/00* | (2006.01) | |
| *G09F 13/22* | (2006.01) | |
| *H05B 33/08* | (2006.01) | |
| *F21S 9/03* | (2006.01) | |
| *F21V 21/08* | (2006.01) | |
| *F21W 121/00* | (2006.01) | |
| *F21Y 101/02* | (2006.01) | |

(52) U.S. Cl.
CPC .. *F21S 4/005* (2013.01); *F21S 2/00* (2013.01); *F21V 1/22* (2013.01); *F21V 3/0445* (2013.01); *F21V 23/00* (2013.01); *G09F 13/22* (2013.01); *H05B 33/0806* (2013.01); *F21S 9/03* (2013.01); *F21V 21/0808* (2013.01); *F21W 2121/004* (2013.01); *F21W 2121/006* (2013.01); *F21Y 2101/02* (2013.01)
USPC ............ 362/249.02; 362/249.01; 362/249.08; 362/249.06; 362/231; 362/240; 362/249.16; 362/220; 362/372

(58) Field of Classification Search
USPC ..................... 362/249.01, 311, 231
See application file for complete search history.

(56) References Cited

U.S. PATENT DOCUMENTS

| | | | |
|---|---|---|---|
| 4,761,720 A | 8/1988 | Solow | |
| 5,359,506 A * | 10/1994 | Koleno | .......................... 362/248 |
| 5,495,147 A | 2/1996 | Lanzisera | |
| 5,594,628 A * | 1/1997 | Reuter et al. | .................. 362/152 |
| 5,813,751 A * | 9/1998 | Shaffer | ..................... 362/249.08 |
| 5,813,753 A * | 9/1998 | Vriens et al. | .................. 362/293 |
| 6,278,372 B1 * | 8/2001 | Velasco et al. | .............. 340/573.1 |
| 6,344,716 B1 | 2/2002 | Gibboney, Jr. | |
| 6,443,590 B1 * | 9/2002 | Lovitt | ........................... 362/103 |
| 6,686,701 B1 * | 2/2004 | Fullarton | .................... 315/185 S |
| 6,933,680 B2 * | 8/2005 | Oskorep et al. | ................. 315/178 |
| 7,175,302 B2 | 2/2007 | Kazar et al. | |
| 7,508,141 B2 * | 3/2009 | Wong | .......................... 315/185 S |
| 7,581,849 B2 * | 9/2009 | Mock | ............................ 362/234 |
| 7,862,220 B2 * | 1/2011 | Cannon et al. | ................. 362/605 |
| 2004/0233668 A1 | 11/2004 | Telfer et al. | |
| 2005/0207156 A1 * | 9/2005 | Wang et al. | ................... 362/240 |
| 2005/0212405 A1 * | 9/2005 | Negley | .......................... 313/502 |

(Continued)

Primary Examiner — Sikha Roy (74) *Attorney, Agent, or Firm* — Billion & Armitage; Richard E. Billion (57) ABSTRACT

A lighting system includes a substrate having openings therein, and a plurality of light emitting diodes positioned within at least some of the openings in the substrate. A power supply is electrically coupled to the plurality of light emitting diodes positioned within the openings. An opaque layer of material substantially covers the substrate and the plurality of openings placed on a first side of the substrate, and the light emitting diodes in the openings. The opaque layer allows light from the plurality of light emitting diodes to pass through the layer when powered. When not powered, the opaque layer substantially hides the plurality of light emitting diodes.

21 Claims, 6 Drawing Sheets

(56) References Cited

U.S. PATENT DOCUMENTS

| | | | |
|---|---|---|---|
| 2005/0237739 A1* | 10/2005 | Lee et al. | 362/241 |
| 2006/0228973 A1 | 10/2006 | Janning | |
| 2007/0159842 A1 | 7/2007 | Cole | |
| 2008/0049420 A1* | 2/2008 | Smith | 362/231 |
| 2010/0296290 A1* | 11/2010 | Yang | 362/249.16 |

* cited by examiner

LED LIGHTING SYSTEM AND METHOD FOR EXTERNAL SURFACES

FIELD OF THE INVENTION

The present inventions relates to a lighting apparatus and lighting system using light emitting diodes (LEDs). In addition, the present inventions include methods for manufacturing, installing and using the lighting apparatus and lighting system.

BACKGROUND

A typical use of lighting systems is on a residential dwelling. When the holidays roll around, one of the many chores includes hanging decorative lights on the residential dwelling. The chore is not only bothersome, but may be dangerous. In the northern climates, the weather is cold. It may be so cold that ice has formed on various surfaces. If it is desired to hang the lights "up high" then the person doing the chore may have to climb the ladder to hang the lights. If there is frost or ice on the ground this chore can pose quite a danger. The older the person doing the chore the more dangerous this chore becomes. For example, an older gentleman may not have the strength or the balance that he had in his youth. If hanging lights using a ladder this may result in a high risk of a fall. Such a fall could produce an injury.

The result is typically very pretty in the evenings and rather unsightly during the day. The days are short, so the level of "suffering" produced by the unsightly strings of lights is tolerable. However, shortly after the holidays are concluded, someone is usually not gaining the benefit of having pretty lights shining during the night so there is a call to pull them down. Taking the light strings down is typically more dangerous than putting them up. Shortly after New Years in the Northern Hemisphere, there generally is snow on the ground and the possibility of ice is reality rather than a mere possibility. Typically, someone in the household decides that the unsightly lights are producing no benefit and must come down. Using a ladder in these conditions to remove the lights poses even more of a risk of falling or injury.

The hanging of lights on a residence used to occur for one set of holidays a year. Now, marketing moguls are increasing light sales be producing strings of lights for other holiday celebrations during the year. For example, it has become popular to set out strings of lights for Halloween and Easter. Of course, the lights are "themed" for the various holidays. In other words, the lights associated with Christmas will not work for the lights set out for Halloween. Accordingly, the ritual of hanging lights for the holiday and taking them down is starting to happen with more regularity since the process must be repeated for several holidays per year. If the marketeers of the world have their way, people will be changing lights for many of the various holidays.

DESCRIPTION OF THE INVENTION

All Figures are illustrated for ease of explanation of the basic teachings of the present invention only; the extensions of the Figures with respect to number, position, relationship and dimensions of the parts to form the preferred embodiment will be explained or will be within the skill of the art after the following description has been read and understood. Further, the exact dimensions and dimensional proportions to conform to specific force, weight, strength, and similar requirements for various applications will likewise be within the skill of the art after the following description has been read and understood.

Where used in various Figures of the drawings, the same numerals designate the same or similar parts. Furthermore, when the terms "top," "bottom," "right," "left," "front," "rear," "first," "second," "inside," "outside," and similar terms are used, the terms should be understood to reference only the structure shown in the drawings and utilized only to facilitate describing the illustrated embodiments.

Figure 1:
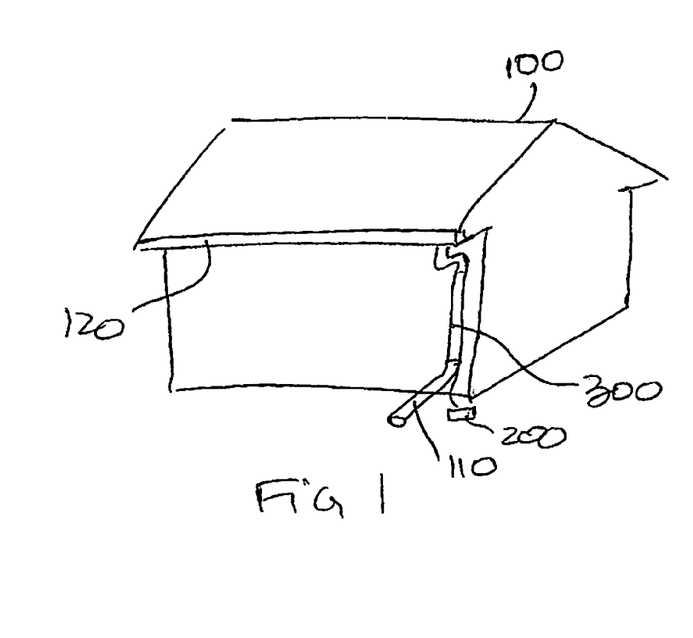
FIG. 1 is perspective view of a lighting system positioned on a downspout of a residential structure, according to an example embodiment.

FIG. 1 is perspective view of a lighting system 300 positioned on a downspout 110 of a residential structure 100, according to an example embodiment. The downspout 110 is essentially white in color and the outer layer of the lighting system 300 that is visible is essentially white in color. The light system 300 is electrically connected to a power source 200. The power source can be any power source. In one preferred embodiment, the power source 200 is transformer which outputs a direct current (DC). In another example embodiment, a solar cell is used to charge a battery. The solar cell charges the battery during hours of daylight and discharges during the night when the lighting system 300 is powered. The solar cell and battery can be used as the sole source of power or can be used to supplement another source of power such as a transformer. In another embodiment, a small turbine can turn a generator which in turn charges a battery day or night. The battery is then dissipated during the hours when the light is on. Again, this too can be used as a supplement to another power source 200.

The lighting system 300 need not necessarily have a white exterior color viewable as attached to the downspout 110. The lighting system 300 can come in a variety of colors. When the color of the exterior portion of the lighting system 300 substantially matches the color of the trim on a residence 100, then the lighting system blends in with the residence. Some may even say the lighting system is camoflauged with the residence. This allows a lighting system 300 to stay attached to the residence 100 for several seasons or even several years. During the day, the lighting system 300 will not be noticed and will look like a normal downspout. When powered during hours of darkness, the lights will shine through an opaque layer and present a pleasing array of lights to those outside the residence. The lighting system 300 can also be used inside a residence to provide supplemental or decorative lighting to a room.

Figure 2:
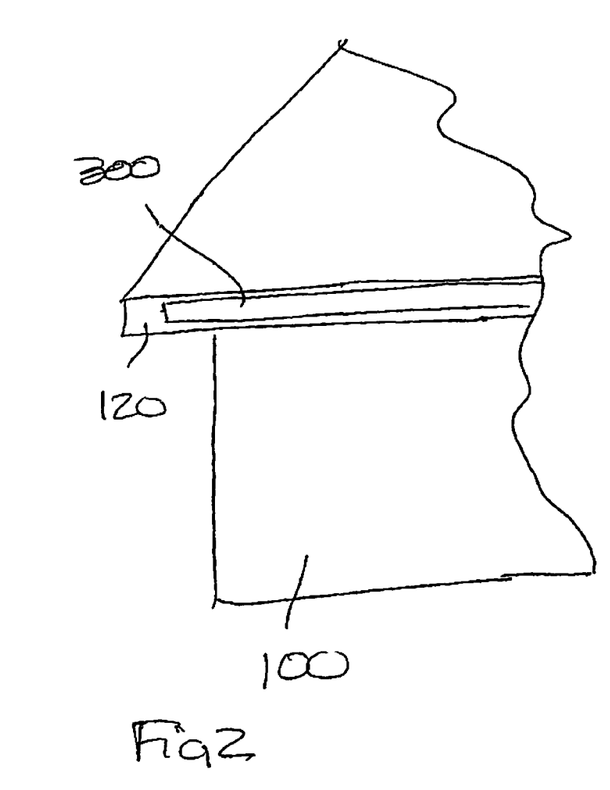
FIG. 2 is perspective view of a lighting system positioned on a facia of a residential structure, according to an example embodiment.

FIG. 2 is partial perspective view of a lighting system 300 positioned on a facia 120 of a residential structure 100, according to an example embodiment. Thus the lighting system 300 is adaptable and can be used on any portion of a structure, such as a residence 100. The lighting system 300 can be used on the exterior or the interior of a structure. In addition, the lighting system 300 is colored so that it blends in with the surface to which it is attached. In this manner, the lighting system will blend in when the lights are unpowered, but the lights will shine through an opaque covering and be visible when the lights are powered.

Figure 3:
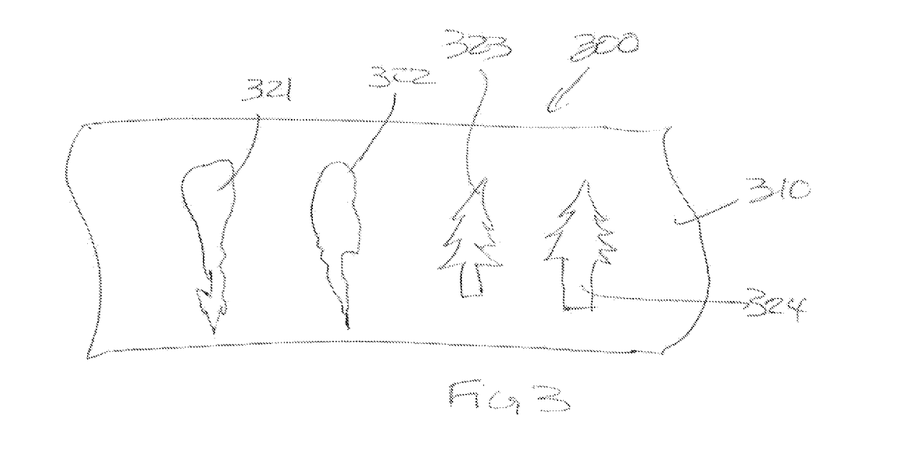
FIG. 3 is a top view of a substrate having openings therein which forms a portion of the lighting system, according to an example embodiment.

FIG. 3 is a top view of a substrate 310 having openings 320, 321, 322, 323 therein which forms a portion of the lighting system 300, according to an example embodiment. The substrate can have different types of openings therein. For example, as shown the openings 320, 321 are shaped like icicles while the openings 322, 323 are shaped like pine trees. The opening can be of any shape. The openings can also correspond to a theme. The openings could be ghosts and goblins and monsters so that they correspond to a Halloween theme. The openings could also be maple leaf shaped, or oak leaf shaped to correspond to fall leaves. The openings could also be shaped like bulbs, so they appear to be more like Christmas lights. The openings could also be shaped like hearts to correspond to Valentines Day. In essence, the openings do not all have to be uniform and can correspond to any holiday for any country or can take on more of a universal theme. The openings 320, 321, 322, 323 could also correspond to a plurality of themes or holidays which could be switched on selectively so that a single lighting system 300 could be used to cover multiple holidays or themes throughout the course of a year.

Figure 4:
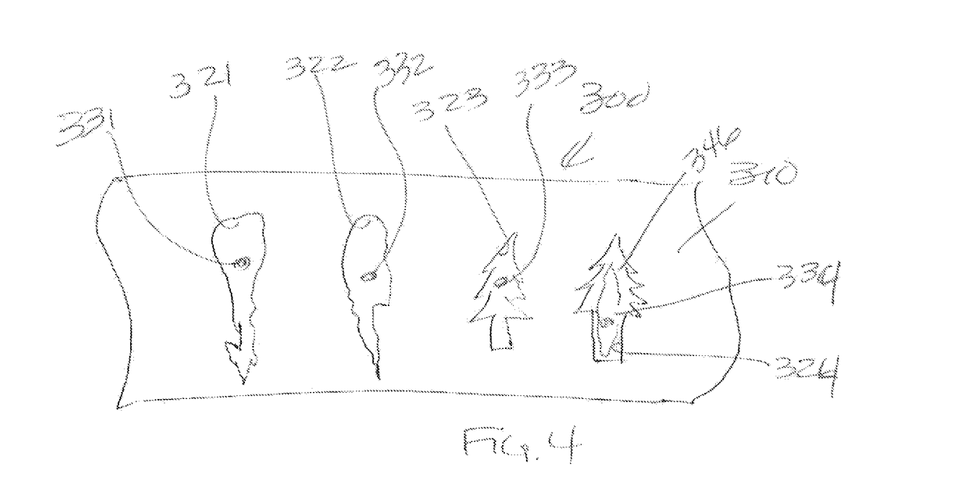
FIG. 4 is top view of the substrate having at least some of the openings populated with lights such as light emitting diodes, according to an example embodiment.

FIG. 4 is top view of the substrate having at least some of the openings populated with lights such as light emitting diodes 330, 331, 332, 333, according to an example embodiment. The light emitting diodes 330, 331, 332, 333 are electrically connected to a power source, such as power source 200 shown in FIG. 1. The substrate, in one embodiment, is made of a light absorbing material. The light absorbing material prevents the light from bleeding or shining at positions outside the respective opening. Most light emitting diodes 330, 331, 332, 333 have an angle through which they shine. In some embodiments, one or all of the openings 330, 331, 332, 333 can be provided with a reflective layer or substance to direct the light out through an opaque covering. Opening 326 includes a reflective portion 346 for directing light through the top of the opening. The substrate 310 is generally approximately as thick as the light emitting diodes 330, 331, 332, 333. Light emitting diodes are thin. For example, the light emitting diodes are available from Hebei I. T. Co., Ltd. of Shanghai, China which does business over the internet at LEDZ.com have a thickness of less than 3 mm and some have a thickness of 2.5 mm (such as part numbers 913PW04C, 913PWC, 913LB7C, 913PG2C, 913MY8C, and 913MR2C).

Figure 5:
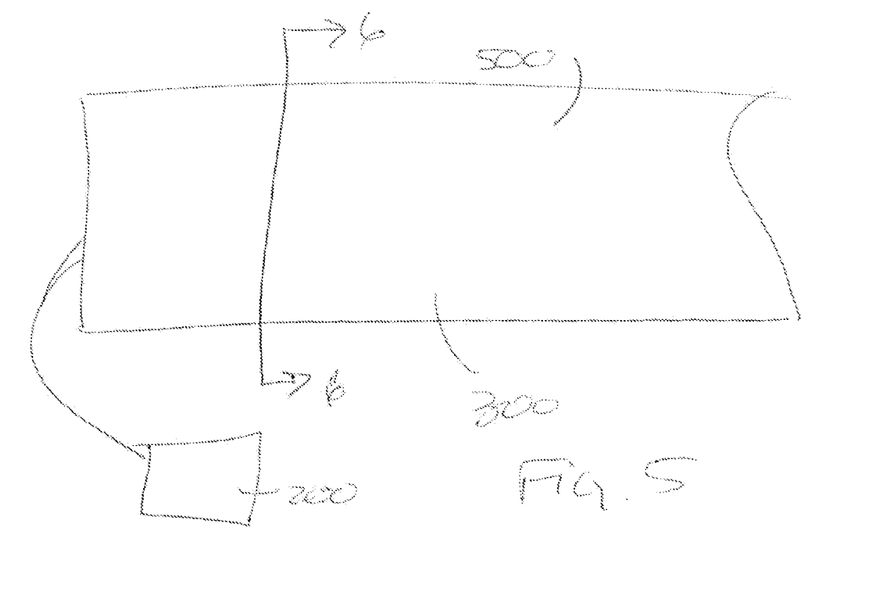
FIG. 5 is top view of the lighting system having an opaque layer positioned over the substrate, openings and lights, according to an example embodiment.

FIG. 5 is top view of the lighting system 300 having an opaque layer 500 positioned over the substrate 310, openings 320, 321, 322, 323 and lights 330, 331, 332, 333, according to an example embodiment. The opaque layer 500 is thin and is opaque in the presence of strong light, such as sunshine. In this manner, the opaque layer 500 serves to cover the substrate 500 and lights 330, 331, 332, 333 during the day so that the lighting system blends in. The opaque layer 500 allows the light from the light emitting diodes 330, 331, 332, 333 to shine through when the lights emitting diodes 330, 331, 332, 333 are powered such as during hours of darkness or in low light conditions. In one embodiment, the opaque layer is a thin plastic layer with a covering of paint. In other embodiments, the opaque layer is a thin layer of colored plastic. The plastic layer used to form an opaque layer 500 is generally just thick enough for the purpose of durability. In another embodiment, the opaque layer could be of a thin rubber material which is generally just thick enough for the purpose of durability.

In the embodiment shown in FIG. 5, the opaque layer 500 is substantially flat or made of a substantially flat material.

Figure 6:
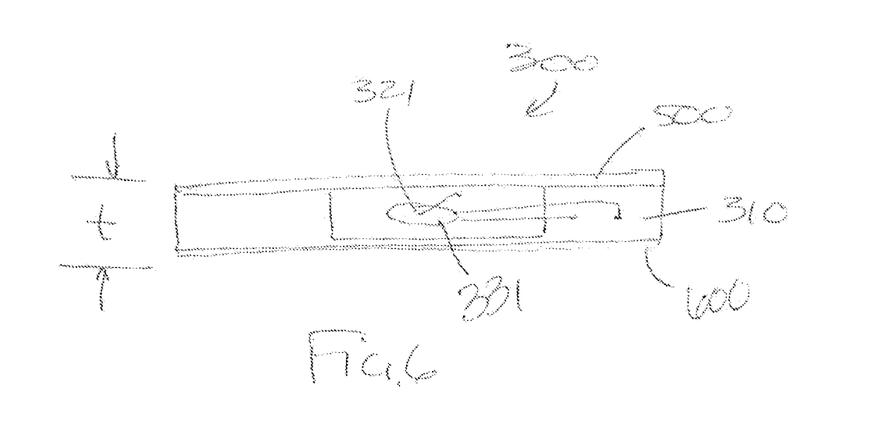
FIG. 6 is cross sectional view of the lighting system, according to an example embodiment.

FIG. 6 is cross sectional view of the lighting system 300, according to an example embodiment. The lighting system 300 includes a substrate 310 having an opening therein 321. The opening 321 includes a thin light, such as a thin light emitting diode 331. The light emitting diode 331 is electrically coupled or connected to other of a plurality of lights associated with the lighting system 300. Conductors 620 and 621 connect to the other parts of an electrical circuit included in the lighting system 300. The opaque layer 500 covers the opening 321 and the light emitting diode 331 and the substrate 310. The opposite side of the substrate 500 includes an adhesive material 600 to facilitate attachment of the material to a surface, such as a structural component of a house. The lighting system has an overall thickness t. The thickness is generally in the range of 0.010 inches to 0.30 inches. In one embodiment, the lighting system 300 can be rolled up so that it can be dispensed as a roll and merely rolled onto a surface for application.

Figure 7:
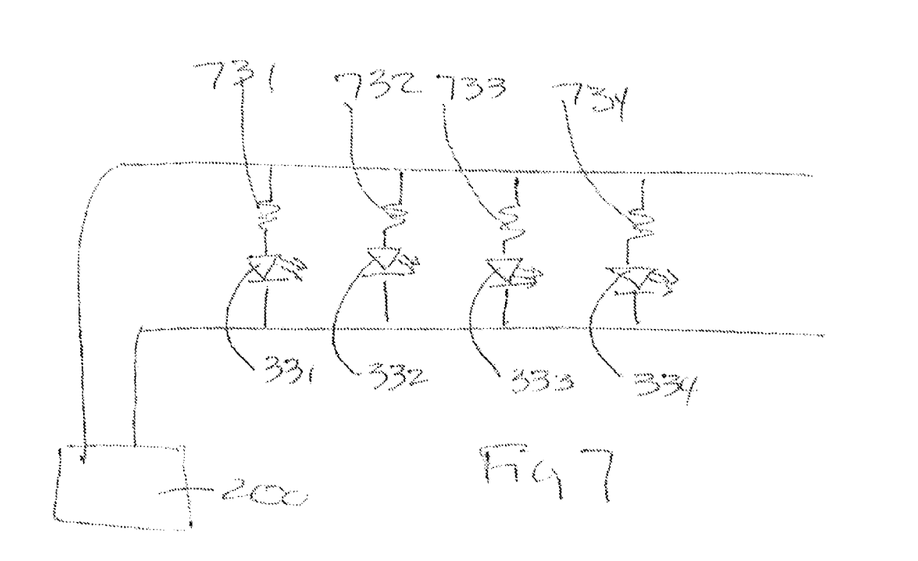
FIG. 7 is schematic wiring diagram of the lighting system, according to an example embodiment.
Figure 8:
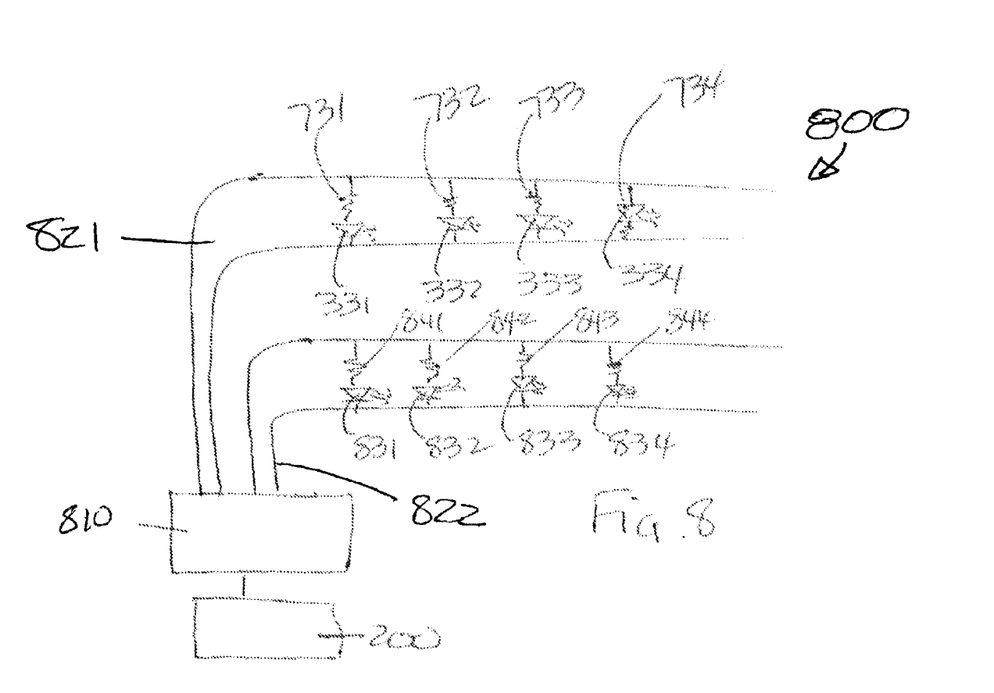
FIG. 8 is a schematic wiring diagram of the lighting system, according to another example embodiment.

FIG. 7 is schematic wiring diagram of the lighting system 300, according to an example embodiment. The lighting system 300 includes light emitting diodes 331, 332, 333, 334 that are electrically connected in parallel to the power source 200. A resistor 731 is placed in serial connection with the diode 331 to drop the voltage down to a recommended level. LED's of different colors generally have differing recommended operating levels. Similarly, light emitting diodes 332, 333, 334 have resistors 732, 733, 734, placed in series to drop the voltage to each of the light emitting diodes respective recommended levels. In this way light emitting diodes of different types and different colors can be used and operated at recommended voltage levels, FIG. 8 is a schematic wiring diagram of a lighting system 800, according to another example embodiment. The schematic wiring diagram includes a controller 810 that is attached to a first parallel circuit 821 of light emitting diodes 331, 332, 333, 334 and a second parallel circuit 822 of light emitting diodes 831, 832, 833, 834. In the first parallel circuit 821, the light emitting diodes 331, 332, 333, 334 have resistors 731, 732, 733, 734, placed in series to drop the voltage to each of the light emitting diodes respective recommended levels. Similarly, the second parallel circuit 822, the light emitting diodes 831, 832, 833, 834 have resistors 841, 842, 843, 844, placed in series to drop the voltage to each of the light emitting diodes respective recommended levels. The controller 810 is used to control the first parallel circuit 821 and the second parallel circuit 822 in a desired manner. The controller 810 can be programmable or may be merely a switch. For example, the controller may be used to provide a light show of sorts, in one embodiment. In another embodiment, the controller can be used to switch between lights associated with Thanksgiving which are associated with one of the first parallel circuit 821 or the second parallel circuit 822 to lights associated with Christmas which is the other of the parallel circuit 821 or 822. It should be noted that there could be many parallel circuits that each carried different colored or differently themed lights controlled by the controller 810.

Figure 9:
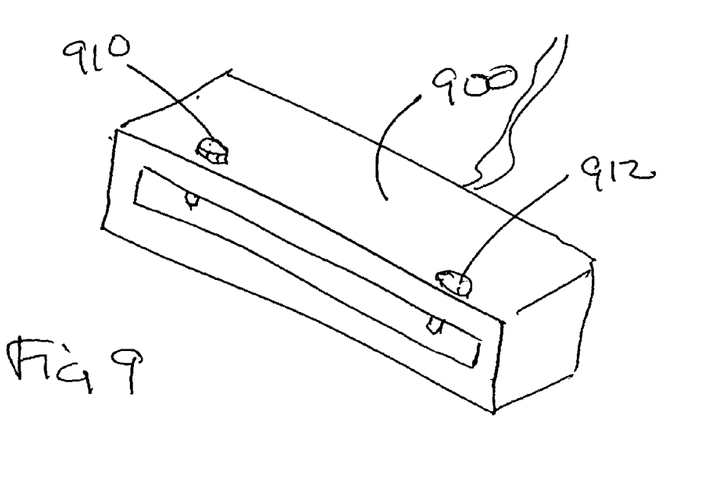
FIG. 9 is a perspective view of a connector or terminator, according to an example embodiment.

FIG. 9 is a perspective view of a connector/terminator 900, according to an example embodiment. The connector/terminator 900 includes a pocket for receiving an end of the lighting system. The connector/terminator includes a set of connectors 910, 912 that are positioned to electrically connect with selected conductors within the lighting system 300. In essence, the placement of the conductors in the lighting system 300 is carefully controlled so that the lighting system can be cut and the connector/terminator 900 placed over the cut end of the lighting system 300. In one embodiment, the connector/terminator 900 includes conductors within the pocket of the connector/terminator 900. In another embodiment, the connector/terminator 900 includes a set of screws which pierce the lighting system to electrically contact the conductors in the lighting system 300. The set of screws or individual contacts in the connector/terminator 900 are in turn connected to other electrical conductors which can be attached to another lighting system (not shown).

Figure 10:
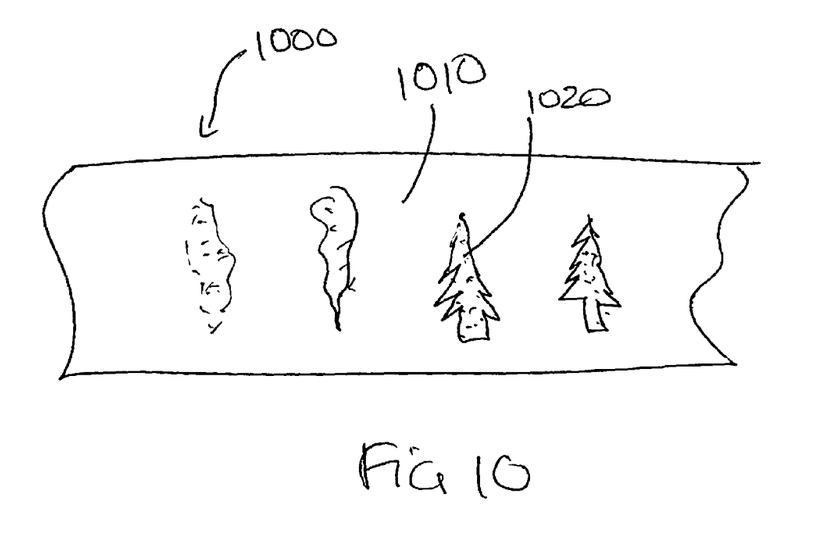
FIG. 10 is top view of the lighting system having another covering layer positioned over the substrate, openings and lights, according to an example embodiment.

FIG. 10 is top view of another lighting system 1000 having another covering layer 1000 positioned over the substrate, openings and lights, according to an example embodiment. This embodiment differs in that the opaque layer is replaced with a different type of covering over the substrate. In some embodiments, a color of covering will be needed to match a common trim color and the color will interfere with the color of the lights. For example, brown is a popular trim color. Brown, however, even if translucent, will change white Christmas icicles to brown or tan icicles. The cover 1010 includes perforations or small openings 1020 in the brown or colored portion of the lighting system. In one embodiment, the position of the perforations 1020 will substantially correspond to the positions of the openings in the substrate. A clear plastic will cover the openings and keep out the elements for lighting systems that are designed for exterior use. The openings can also be colored to match the color of the covering 1010. In this way, the lighting system 1000 will blend in with the background color to which it will be attached and the lights will still be seen during hours of darkness as true colors. In some embodiments, the top layer can be painted.

Figure 11:
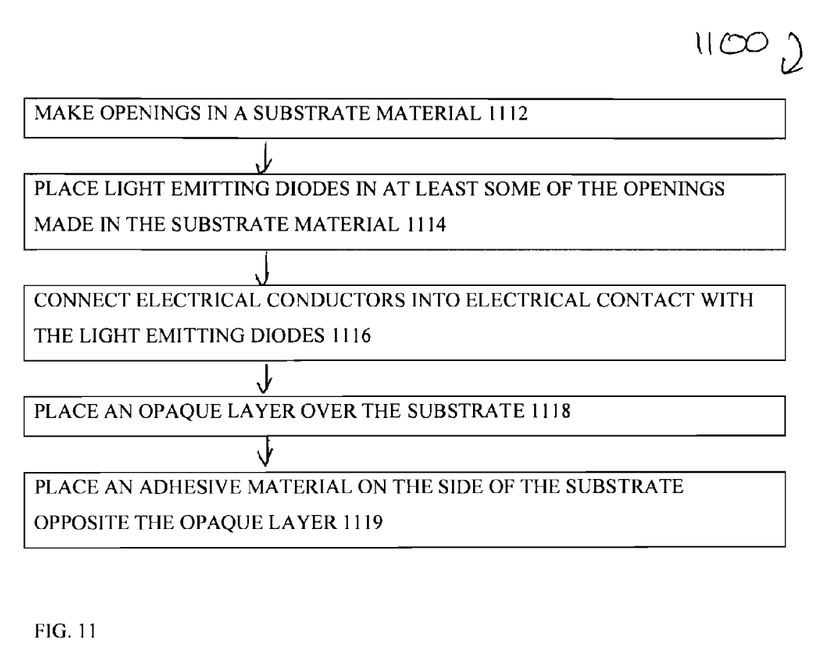
FIG. 11 is flow chart of a method 1100 for assembling the lighting system, according to an example embodiment.

FIG. 11 is a flow diagram 1100 of a method 1100 for assembling a lighting system, according to an example embodiment. The method 1100 of forming a lighting system includes making openings in a substrate material 1112, placing light emitting diodes in at least some of the openings made in the substrate material 1114, connecting electrical conductors into electrical contact with the light emitting diodes 1116, and placing an opaque layer over the substrate 1118. The method also includes placing an adhesive material on the side of the substrate opposite the opaque layer 1119.

A lighting system includes a substrate having openings therein, and a plurality of light emitting diodes positioned within at least some of the openings in the substrate. A power supply is electrically coupled to the plurality of light emitting diodes positioned within the openings. An opaque layer of material substantially covers the substrate and the plurality of openings placed on a first side of the substrate, and the light emitting diodes in the openings. The opaque layer allows light from the plurality of light emitting diodes to pass through the layer when powered. When not powered, the opaque layer substantially hides the plurality of light emitting diodes. In some embodiments, the opaque layer is made of a color that corresponds to color of a nearby surface to which the lighting system will be used. In some embodiments, the lighting system also is provided with an adhesive layer on a second side of the material. In some embodiments, the plurality of light emitting diodes are of different colors. In some embodiments, the plurality of light emitting diodes are electrically coupled to the power supply in parallel. In still other embodiments, there is a first resistor placed in series with a first light emitting diode, and a second resistor placed in series with a second light emitting diode. The first lighting emitting diode and the first resistor electrically coupled in parallel with the second and the second light emitting diode. The plurality of light emitting diodes can be flat light emitting diodes. In some embodiments, the plurality of light emitting diodes include at least one capable of making several colors. The lighting system, in some embodiments, has a thickness in the range of 0.10 mm to 3.0 mm, and in other embodiments the thickness is in the range of 0.50 mm to 2.0 mm. The substrate is an elastomeric material, and the opaque layer has substantially the same color as a structure to which it will be attached. In other words, in certain applications, the lighting system will be difficult to detect or see. Some of the embodiments of the lighting system also include a connector. The connector includes a pocket sized to receive an end of the substrate and the opaque layer, a first electrical connector positioned to contact a first electrical conductor of the substrate, and a second electrical connector positioned to contact a second electrical conductor of the substrate. A first wire is attached to the first electrical connector, and a second wire is attached to the second electrical connector. In some embodiments, the opening in the substrate further includes a reflector portion positioned to direct light from the light emitting diode through the opaque layer.

A lighting system includes a substrate having a first set of openings and a second set of openings therein, a first plurality of light emitting diodes positioned within at least some of the first set of openings, and a second plurality of light emitting diodes positioned within at least some of the second set of openings. A power supply is electrically coupled to the first plurality of light emitting diodes and the second plurality of light emitting diodes. The lighting system also includes a switch for selectively enabling a first plurality of light emitting diodes and a second plurality of light emitting diodes. An opaque layer of material substantially covers the substrate and the plurality of openings placed on a first side of the substrate. The opaque layer allows light from the plurality of light emitting diodes to pass through the layer when powered and substantially hides the plurality of light emitting diodes when not powered. In one embodiment, at least some of the plurality of light emitting diodes are flat light emitting diodes. In another embodiment, at least some of the plurality of light emitting diodes are capable of producing several colors. The thickness of the lighting system is in the range of 0.10 mm to 3.0 mm. In some embodiments, the lighting system also includes resistors associated with at least some of the first plurality of light emitting diodes and the second set of light emitting diodes. The opaque layer serves to effectively camouflage the lighting system when placed on selected building structures. For example when a lighting system has an opaque layer that is substantially flat white in color, the lighting system is difficult to detect on flat white gutters, flat white downspouts, or a flat white fascia.

Although a few variations have been described and illustrated in detail above, it should be understood that other modifications are possible. In addition it should be understood that the logic flow depicted in the accompanying figures and described herein do not require the particular order shown, or sequential order, to achieve desirable results. Other embodiments may be within the scope of the following claims.

The foregoing discussion discloses and describes merely exemplary embodiments of the present inventions. Upon review of the specification, one skilled in the art will readily recognize from such discussion, and from the accompanying figures and claims, that various changes, modifications and variations can be made therein without departing from the spirit and scope of the invention as defined in the following claims.

The invention claimed is:

1. A lighting system for attaching to an exterior surface of buildings comprises:
   a flexible substrate having openings therein, the flexible substrate having a substantially rectangular cross section;
   a plurality of light emitting diodes positioned within at least some of the openings;
   a power supply electrically coupled to the plurality of light emitting diodes positioned within at least some of the openings; wherein the openings are shaped to correspond to plurality of themes and at least one of the openings is selectively lighted corresponding to one of the themes; and
   an opaque layer of material substantially covering the substrate and the plurality of openings placed on a first side of the substrate, the first side of the substrate being substantially planar, the opaque layer being substantially planar and allowing light from the plurality of light emitting diodes to pass through the opaque layer when powered and substantially hiding the plurality of light emitting diodes when not powered, the opaque layer colored to substantially match a portion of the exterior surface of a building.

2. The lighting system of claim 1 further comprising an adhesive layer on a second side of the substrate.

3. The lighting system of claim 1 wherein the plurality of light emitting diodes are of different colors.

4. The lighting system of claim 1 wherein the plurality of light emitting diodes are electrically coupled to the power supply in parallel.

5. The lighting system of claim 4 further comprising a first resistor placed in series with a first light emitting diode, and a second resistor placed in series with a second light emitting diode, the first lighting emitting diode and the first resistor electrically coupled in parallel with the second and the second light emitting diode.

6. The lighting system of claim 1 wherein the plurality of light emitting diodes are flat light emitting diodes.

7. The lighting system of claim 1 wherein the plurality of light emitting diodes include at least one capable of making several colors.

8. The lighting system of claim 1 having a thickness in the range of 0.25 mm to 3.0 mm.

9. The lighting system of claim 1 wherein the plurality of themes correspond to specific seasons.

10. The lighting system of claim 1 wherein the substrate is an elastomeric material.

11. The lighting system of claim 1 wherein the plurality of themes correspond to specific holidays.

12. The lighting system of claim 1 further comprising a connector, the connector further comprising:
   a pocket sized to receive an end of the substrate and the opaque layer;
   a first electrical connector positioned to contact a first electrical conductor of the substrate;
   a second electrical connector positioned to contact a second electrical conductor of the substrate;
   a first wire attached to the first electrical connector; and
   a second wire attached to the second electrical connector.

13. The lighting system of claim 1 wherein the opening in the substrate further includes a reflector portion positioned to direct light from the light emitting diode through the opaque layer.

14. A lighting system for substantially flat surfaces associated with buildings comprises:
   a flexible substrate having a first set of openings and a second set of openings therein, the flexible substrate having a substantially rectangular cross section;
   a first plurality of light emitting diodes positioned within at least some of the first set of openings;
   a second plurality of light emitting diodes positioned within at least some of the second set of openings;
   wherein the first set of openings and the second set of openings are shaped to correspond to plurality of themes and at least one of the openings is selectively lighted corresponding to one of the themes;
   a power supply electrically coupled to the first plurality of light emitting diodes and the second plurality of light emitting diodes;
   a switch for selectively enabling a the first plurality of light emitting diodes and the second plurality of light emitting diodes; and
   an opaque layer of material substantially covering the substrate and the plurality of openings placed on a first side of the substrate, the opaque layer being substantially flat and allowing light from the plurality of light emitting diodes to pass through the layer when powered and substantially hiding the plurality of light emitting diodes when not powered, the first side being substantially planar.

15. The lighting system of claim 14 wherein the plurality of light emitting diodes are flat light emitting diodes.

16. The lighting system of claim 14 wherein the plurality of light emitting diodes include at least one capable of making several colors.

17. The lighting system of claim 14 having a thickness in the range of 0.25 mm to 3.0 mm.

18. The lighting system of claim 14 further comprising resistors associated with at least some of the first plurality of light emitting diodes and the second set of light emitting diodes.

19. The lighting system of claim 14 wherein opaque layer camoflauges the lighting system when placed on selected building structures.

20. A method of forming a lighting system for buildings comprising:
   making openings in a flexible substrate material having a substantially rectangular cross section;
   wherein the openings are shaped to correspond to plurality of themes and at least one of the openings is selectively lighted corresponding to one of the themes;
   placing light emitting diodes in at least some of the openings made in the substrate material;
   connecting electrical conductors into electrical contact with the light emitting diodes; and
   placing a substantially flat opaque layer over the substrate to form a substantially flat surface on the lighting system; and
   selecting a color for the substantially flat opaque layer that substantially matches the color of a portion of the building to which the lighting system will be attached.

21. The method of claim 20 further comprising placing an adhesive material on the side of the substrate opposite the opaque layer.

* * * * *